(12) United States Patent
Gardner et al.

(10) Patent No.: US 10,170,244 B2
(45) Date of Patent: Jan. 1, 2019

(54) FABRICATION OF POROUS SILICON ELECTROCHEMICAL CAPACITORS

(75) Inventors: Donald S. Gardner, Los Altos, CA (US); Cary L. Pint, Hayward, CA (US); Charles W. Holzwarth, San Jose, CA (US); Wei Jin, Sunnyvale, CA (US); Zhaohui Chen, San Jose, CA (US); Yang Liu, State College, PA (US); Eric C. Hannah, Pebble Beach, CA (US); John L. Gustafson, Pleasanton, CA (US)

(73) Assignee: INTEL CORPORATION, Santa Clara, CA (US)

( * ) Notice: Subject to any disclaimer, the term of this patent is extended or adjusted under 35 U.S.C. 154(b) by 245 days.

(21) Appl. No.: 13/997,881

(22) PCT Filed: Dec. 27, 2011

(86) PCT No.: PCT/US2011/067434
§ 371 (c)(1),
(2), (4) Date: Jun. 25, 2013

(87) PCT Pub. No.: WO2013/100916
PCT Pub. Date: Jul. 4, 2013

(65) Prior Publication Data
US 2014/0233152 A1   Aug. 21, 2014

(51) Int. Cl.
*H01G 11/86* (2013.01)
*H01G 4/008* (2006.01)
(Continued)

(52) U.S. Cl.
CPC .............. *H01G 4/008* (2013.01); *H01G 11/00* (2013.01); *H01G 11/26* (2013.01); *H01G 11/30* (2013.01);
(Continued)

(58) Field of Classification Search
CPC ........ H01G 4/008; H01G 11/30; H01G 11/28; H01G 11/04; H01G 11/42; H01G 11/26; H01G 11/86
(Continued)

(56) References Cited

U.S. PATENT DOCUMENTS 5,455,430 A * 10/1995 Noguchi ................. H01L 29/04
 136/256
5,508,542 A *  4/1996 Geiss ................ H01L 27/10861
 257/301

(Continued)

FOREIGN PATENT DOCUMENTS

DE   60312217 T2   11/2007
WO   2007013077 A2   2/2007
(Continued)

OTHER PUBLICATIONS

Office Action from the foreign counterpart Taiwan Patent Application No. 101149593, dated Oct. 27, 2014, 7 pages.
(Continued)

*Primary Examiner* — Nguyen Ha
(74) *Attorney, Agent, or Firm* — Womble Bond Dickinson (US) LLP

(57) ABSTRACT

Methods of forming microelectronic structures are described. Embodiments of those methods may include forming an electrochemical capacitor device by forming pores in low-purity silicon materials. Various embodiments described herein enable the fabrication of high capacitive devices using low cost techniques.

29 Claims, 10 Drawing Sheets

(51) Int. Cl.
  *H01G 11/30* (2013.01)
  *H01G 11/00* (2013.01)
  *H01G 11/26* (2013.01)
(52) U.S. Cl.
  CPC .............. *H01G 11/86* (2013.01); *Y02E 60/13* (2013.01); *Y10T 29/41* (2015.01)
(58) Field of Classification Search
  USPC ................. 361/502, 503–504, 512, 305, 303
  See application file for complete search history.

(56) References Cited

U.S. PATENT DOCUMENTS

| | | | | |
|---|---|---|---|---|
| 5,635,419 | A | * | 6/1997 | Geiss ................ H01L 27/10861 257/E21.012 |
| 7,404,887 | B2 | | 7/2008 | Katsir et al. |
| 2005/0269617 | A1 | * | 12/2005 | Hofmann ................ H01L 21/84 257/309 |
| 2007/0177332 | A1 | | 8/2007 | Kobayashi et al. |
| 2008/0233330 | A1 | * | 9/2008 | Ohashi ................. G11B 5/7315 428/64.4 |
| 2011/0051322 | A1 | * | 3/2011 | Pushparaj ................ C23C 16/24 361/525 |
| 2013/0224394 | A1 | * | 8/2013 | Hanbuecken .......... B82Y 10/00 427/510 |
| 2013/0279137 | A1 | * | 10/2013 | Gardner ................ B81B 7/0077 361/782 |

FOREIGN PATENT DOCUMENTS

| | | |
|---|---|---|
| WO | 2011/123135 A1 | 10/2011 |
| WO | 2013/100916 A1 | 7/2013 |

OTHER PUBLICATIONS

International Search Report and Written Opinion received for PCT Patent Application No. PCT/US2011/067434, dated Sep. 10, 2012, 10 pages.
International Preliminary Report on Patentability received for PCT Patent Application No. PCT/US2011/067434, dated Jul. 10, 2014, 7 pages.
Office Action received for Taiwan Patent Application No. 101149593, dated Apr. 10, 2014, 26 pages of Office Action and 24 pages of english translation.
Office Action from foreign counterpart Taiwan Patent Application No. 101149593, dated Sep. 8, 2016, 23 pages.
India Office Action dated May 31, 2018, (8 pages).

* cited by examiner

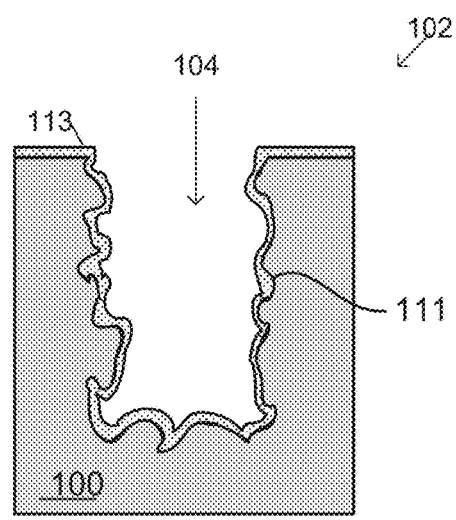
FIG. 1d
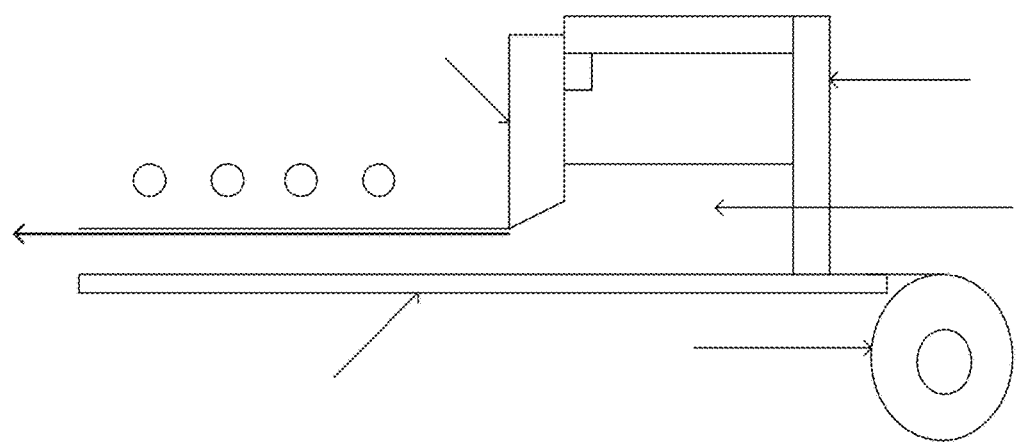

FABRICATION OF POROUS SILICON ELECTROCHEMICAL CAPACITORS

BACKGROUND

Charge storage devices, including batteries and capacitors, are used extensively in electronic devices. In particular, capacitors are widely used for applications ranging from electrical circuitry and power delivery to voltage regulation and battery replacement. As capacitor technology has continued to develop, several types have emerged. For example, electrochemical capacitors, including electric double-layer capacitors (EDLCs), also referred to as ultra-capacitors (among other names), are a type of capacitor characterized by high energy storage and power density, small size, and low weight, and have thus become promising candidates for use in several applications.

BRIEF DESCRIPTION OF THE DRAWINGS

While the specification concludes with claims particularly pointing out and distinctly claiming certain embodiments, the advantages of the various embodiments can be more readily ascertained from the following description of the embodiments when read in conjunction with the accompanying drawings in which:

FIGS. 1b-1g represent structures according to embodiments.

DETAILED DESCRIPTION

Figure 1A:
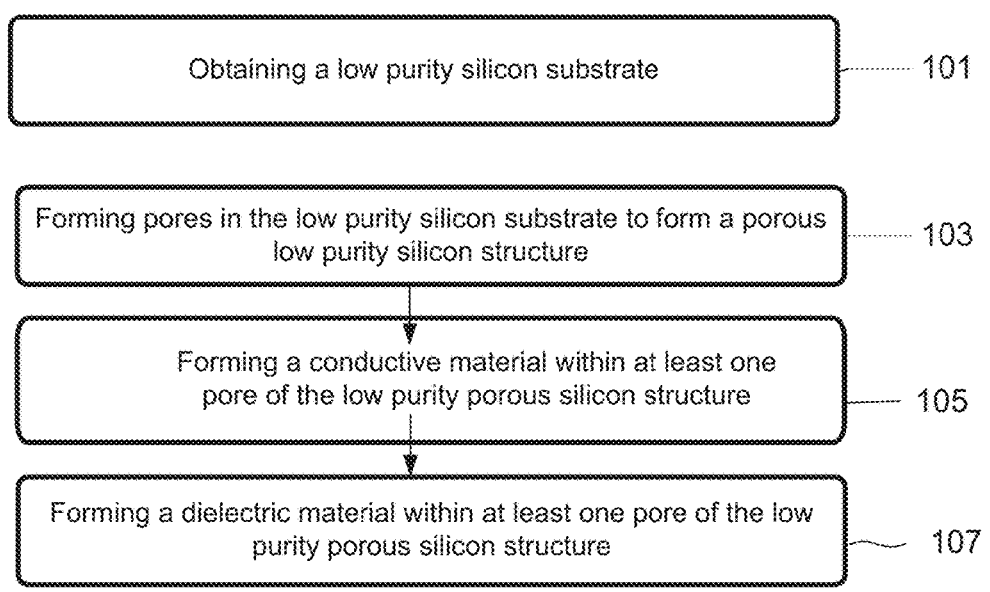
FIG. 1a represents a flowchart of a method of forming structures according to embodiments.

In the following detailed description, reference is made to the accompanying drawings that show, by way of illustration, the specific embodiments which may be practiced. These embodiments are described in sufficient detail to enable those skilled in the art to practice the embodiments. It is to be understood that the various embodiments, although different, are not necessarily mutually exclusive. For example, a particular feature, structure, or characteristic described herein, in connection with one embodiment, may be implemented within other embodiments without departing from their spirit and scope. In addition, it is to be understood that the location or arrangement of individual elements within each disclosed embodiment may be modified without departing from theft spirit and scope. The following detailed description is, therefore, not to be taken in a limiting sense, and the scope of the embodiments is defined only by the appended claims, appropriately interpreted, along with the full range of equivalents to which the claims are entitled. In the drawings, like numerals refer to the same or similar functionality throughout the several views.

Methods and associated structures of forming and utilizing microelectronic structures, such as electrochemical capacitor structures, are described. Those methods and structures may include forming low purity porous silicon structures by forming pores in a low-purity silicon substrate. Various embodiments described herein enable the fabrication of high capacitive devices using low cost techniques. Techniques for lowering the cost of fabricating porous silicon ultra capacitors for energy storage include using silicon materials such as low-purity silicon, metallurgical-grade silicon, monocrystalline silicon, polycrystalline silicon, and spray-on silicon. Fabrication processes that lower these costs include batch atomic layer deposition (ALD), roll-to-roll ALD and batch electrochemical etching systems.

FIGS. 1a-1g illustrate embodiments of forming microelectronic structures, such as low-purity, low-cost porous silicon structures. FIG. 1a illustrates a flowchart of a method whereby electrochemical capacitor structures may be formed on low purity silicon substrates, for example. In one embodiment, at step 101, a low purity silicon substrate/material may be obtained. The low purity substrate may comprise about 99.999 percent purity or less, such that the cost of such a substrate is significantly less than a cost of a higher purity substrate, such as is typically used in microelectronic device fabrication (in some cases, such high purity substrates comprises a purity level of 99.9999999 percent or greater, and may cost a factor of up to twenty five times as much as the low purity porous silicon material of the embodiments herein).

For example, in some cases, low-purity (99.999%) silicon may cost about one to about six dollars per pound, as compared with high-purity (>99.9999999%) prime-grade silicon which may cost upwards of 25 dollars per pound. In embodiments, a low purity porous silicon structure (to be further described herein) can be prepared by using polycrystalline or mono-crystalline silicon formed from low purity 99.999% or less silicon feedstock as a starting material. To further reduce cost, these low-purity silicon substrates may be prepared by omitting one or more steps of the wafering process used to prepare prime grade silicon substrates, such as lapping, etching, polishing, etc., in some embodiments.

The low purity silicon material comprises impurities such as carbon, oxygen, nitrogen, iron, aluminum, copper, titanium, manganese, chromium, nickel, calcium, zirconium, sodium, and zinc, which are detectable using compositional measurement techniques, such as spectrographic techniques including inductively coupled plasma mass spectrometry (ICP-MS), secondary ion mass spectrometry (SIMS), and glow discharge mass spectrometry (GDMS), for example. These impurities are present at a much higher level in the low purity silicon material than impurity levels found in higher purity silicon materials typically used for device fabrication in the prior art. For example, the impurity levels found in the low purity silicon material may be on the order of about 100 times higher than those found in higher purity silicon materials, in some cases. In an embodiment, the low purity silicon material may be doped with one of a p-type dopant or an n-type dopant, such as boron or phosphorus respectively, for example.

At step 103 of FIG. 1a, pores/channels may be formed in the low purity silicon substrate to form a porous low purity silicon structure. Such a porous low purity silicon structure may be used as a portion of an electrochemical capacitor or other similar energy storage devices, for example. In an embodiment, an etchant may be used to make porous structures in the low purity silicon material. As an example, a low purity porous silicon structure may be created by etching a low purity silicon substrate with a mixture of hydrofluoric acid and may also contain an organic solvent, such as isopropyl alcohol or ethanol.

Figure 1B:
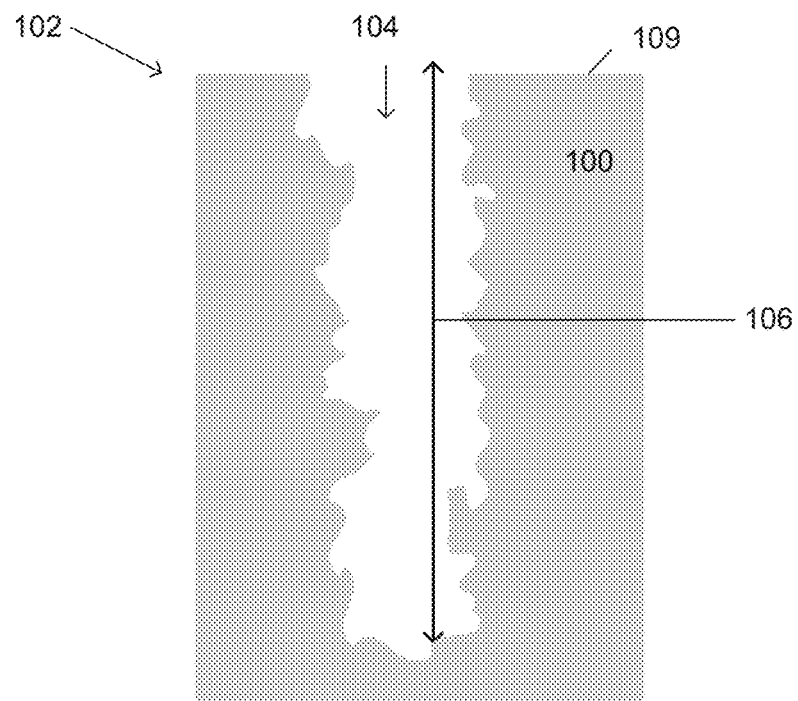

In another embodiment, electrochemical etching, which may comprise batch electrochemical etching in some cases, may be utilized to form pores in the low purity silicon material. In another embodiment, porosity may be introduced by utilizing such processes as anodization and stain etching. In some cases, pores 104 comprising a depth 106 of about 20 microns deep may be formed in the low purity silicon substrate 100 in about 5 minutes, to form the low purity porous silicon structure 102 (FIG. 1b). In other embodiments, pore depth 106 may be up to about 300 microns. Pore depth may vary according to the particular application.

Each one of the pores 104 has an opening to the surface 109 of the low purity porous silicon structure 102. In an embodiment, the openings may be subsequently covered up by a layer of epitaxial silicon that may be formed over the opening, according to the particular application requirements, for example, as a location for circuitry or other wiring that may be grown on top of the channels/pores 104. The low purity porous structure 102 according to embodiments can be fabricated with very precise and uniform pore size distribution control (in contrast to activated carbon). This allows fast charging (pore size may be optimized in order to be compatible with the size of the anions and cations) and also improves the capacitance of charge storage devices utilizing the low purity porous silicon structures 102 of the embodiments described herein.

It should be noted in connection that activated (porous) carbon, being formed in a manner different from that described above, typically has a different structure—one that is characterized by fully-enclosed cavities having no surface openings. It should also be noted that the pores 104 depicted in the various Figures herein are highly idealized in that they are shown as only extending vertically. In some embodiments the channels/pores 104 may branch off in multiple directions to create a tangled, disorderly pattern. In an embodiment, the pores 104 may comprise a tapered structure, that is, a top portion of the pore may comprise a larger diameter than a diameter of a bottom portion of the pore.

Figure 1C:
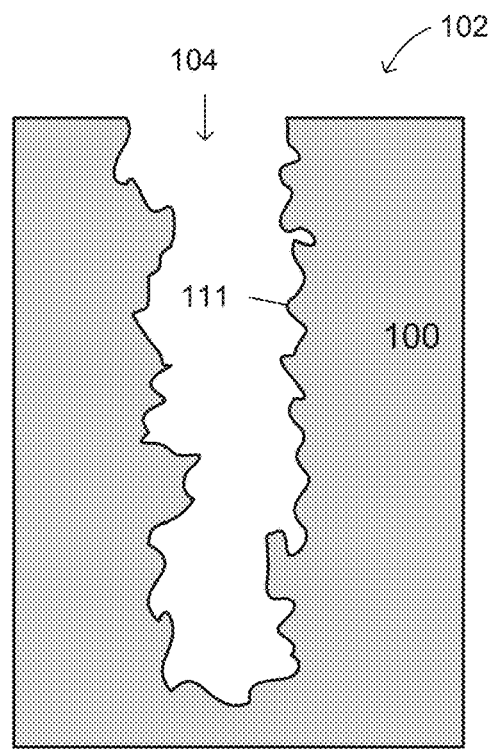

Referring back to FIG. 1a, at step 105, a conductive material may be formed within at least one pore of the low purity porous silicon structure. The at least one pore 104 may be coated/lined with an electrically conductive material 111 by utilizing a process such as a roll-to-roll technique, a batch process and/or an atomic layer deposition process (ALD)(FIG. 1c). In an embodiment, the low purity porous silicon structure 102 may be placed into a deposition system, such as but not limited to an ALD system and/or a doctor blade system. For example, Roll-to-Roll ALD or batch ALD processing can also be used, either to flow precursors used for forming thin films over the low purity silicon substrate, or to flow through the low purity silicon substrate. Also, batch electrochemical etching systems may be used, wherein wafers may be electrically connected in series in a multi-chamber system, in some embodiments.

Figure 3A:
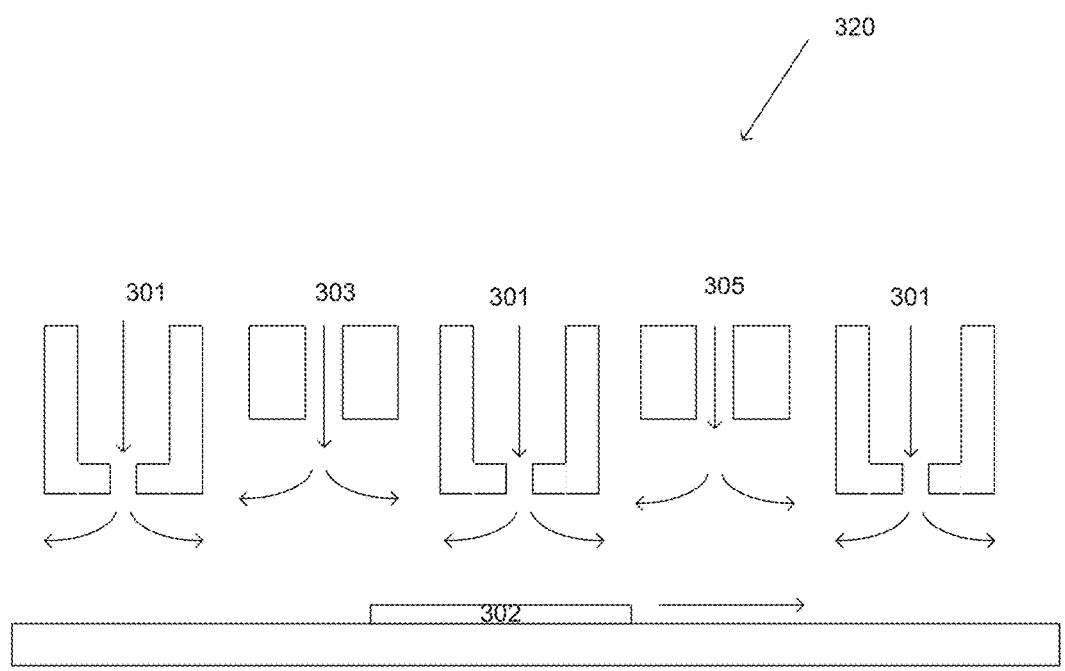
FIGS. 3a-3b represent systems according to embodiments.

Referring to FIG. 3a, an ALD system 320 for coating a low purity porous silicon structure 302 may include a translational system, roll to roll configuration wherein the conductive material may be formed/coated onto the low purity porous silicon structure/substrate 302, which may be in a wafer form in some cases. The ALD system 320 includes ports for gases that may flow over/through the low purity silicon substrate, such as nitrogen 301, tri methyl aluminum (TMA) 303, water 305, etc. according to the particular application. The low purity porous silicon structure 302 may move across the system for high volume manufacturing applications.

Figure 3B:
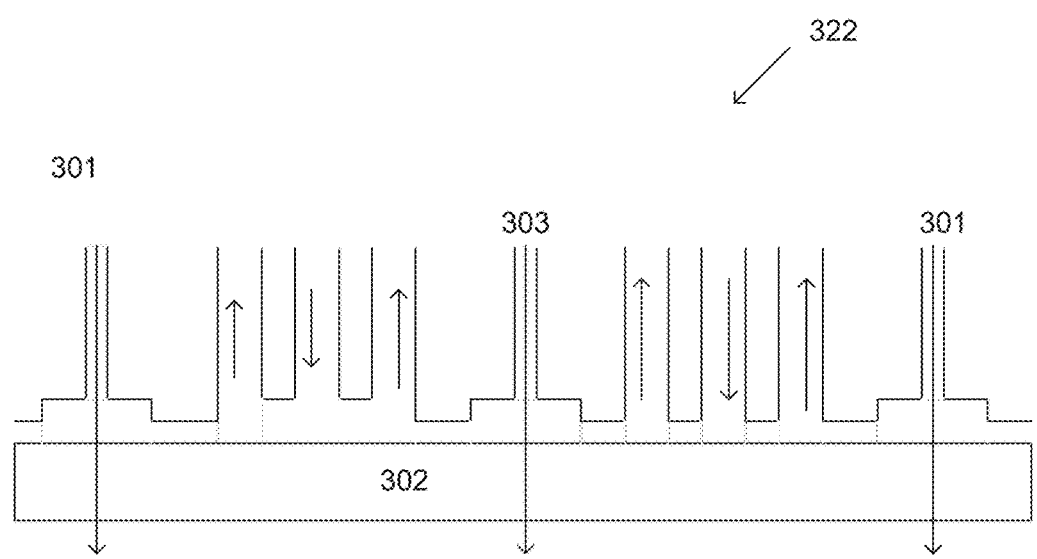

In another embodiment, a system 322 (FIG. 3b) utilizing through-substrate ALD can be used to coat the pores/channels in the low purity porous structure for wafers/low purity porous silicon structures 302 that are etched completely through, in which case the deposition process may be much faster. Gases such as TMA 303 and N2 301 may be utilized, for example. In one embodiment, this may be done using a roll-to-roll ALD process. In another embodiment, the process may be accomplished using a batch ALD reactor (not shown) that can operate between 0.1 and 760 Torr, by illustration. An advantage of using an ALD system is that it can help terminate the bonds at the surface or improve the wettability of the surface of the pores within the wafer 302. Increasing the wettability of the pores allows an electrolyte to penetrate deeper into the pores of the low purity porous silicon structure 302, thereby increasing capacitance of a charge storage device utilizing the low-purity porous silicon structure 302.

The electrically conductive material 111 that may be formed and that may line the pores of the low purity porous silicon structure reduces effective series resistance (ESR) of the low purity porous silicon structure, thereby improving performance. For example, a device having lower ESR is able to deliver higher power (which may be manifested in terms of greater acceleration, more horse power, etc.). In contrast, higher ESR (a condition that prevails inside a typical battery) limits the amount of available energy, at least partially due to the fact that much of the energy is wasted as heat. Examples of suitable electrically conductive materials 111 include, but are not limited to, tungsten, aluminum, copper, nickel, iron, cobalt, carbon (graphene), palladium, ruthenium, tin, and alloys including tin, aluminum titanium nitride (AlTiN), titanium nitride (TiN), tungsten nitride ($WN_2$), tantalum nitride (TaN), tungsten titanium nitride(W—Ti—N), titanium silicon nitride (Ti—Si—N), tungsten silicon nitride (W—Si—N), titanium boron nitride (Ti—B—N), and molybdenum nitride (Mo—N). In one scenario, a very conductive TiN film (resistivity as low as ~20 μohm-cm) could be deposited using an ALD process, for example.

In an embodiment, the electrically conductive material 111 may serve to maintain or enhance the conductivity of the low purity porous silicon structure—especially where the porosity of the low purity porous silicon structure exceeds about 20 percent. In an embodiment, electrically conductive materials 111 may be applied using processes such as electroplating, electroless plating, chemical vapor deposition (CVD), and/or ALD, such as by utilizing a system depicted in FIGS. 3a-3b. If desired, the low purity porous silicon structure can also be doped with a dopant designed to increase the electrical conductivity of the structure (boron, arsenic, or phosphorus, for example).

In another embodiment, a material may be formed within the porous structure in order to form a pseudo capacitor. In some embodiments the material can be a transition metal oxide such as, for example, $MnO_2$, $RuO_2$, $NiO_x$, $Nb_2O_5$, or $V_2O_5$. In other embodiments the material could be WC, VN, or a conducting polymer. In the same or other embodiments, forming the material in the porous structure may be accomplished using an ALD process. Other deposition or formation methods are also possible. The pseudocapacitor is another class of electrochemical capacitor wherein instead of EDL capacitance, a different kind of capacitance—one that is faradaic and not electrostatic in origin-can arise at certain types of electrodes. This different kind of capacitance is called "pseudocapacitance." Pseudocapacitors are energy storage devices that behave like capacitors but also exhibit reactions that result in charge storage. Typically, one of the electrodes of a pseudocapacitor is coated with the transition metal oxide. These materials can be used with an electrolyte such as potassium hydroxide (KOH). When the pseudo capacitor device is charged, the electrolyte will react with the transition metal oxide material in a reaction that allows energy to be stored in a manner that has similarities to a battery's energy storage. More specifically, these materials store energy through highly-reversible surface and subsurface redox (faradic) reactions, but at the same time the electric double layer energy storage mechanism remains in place and provides the potential for high power.

In another embodiment, a dielectric material may be formed within at least one pore of the low purity porous silicon structure (referring back to FIG. 1a, step 107). The dielectric material 113, which may include high k dielectric materials, may comprise a dielectric constant of at least about 3.9 and may line the pore 104 of the low purity porous silicon structure 102 (FIG. 1d). In an embodiment, the dielectric material 113 may be disposed on the conductive material 111 that is disposed on the low purity porous silicon substrate 100. In another embodiment, the conductive material 111 may be disposed on the dielectric material 113 that may be formed directly on the low purity porous silicon substrate 100.

In general, high energy density is a desired characteristic for capacitive structures. In order to increase the achievable energy density, embodiments herein incorporate materials that allow for relatively higher breakdown voltages, such as the conductive 111 and dielectric materials 113 used in the embodiments herein. Thus the overall breakdown voltage of charge storage devices utilizing the low purity porous silicon structures of the embodiments is increased.

As an example, materials that increase breakdown voltage can either be good electrical insulators or they can be very electrochemically inert (e.g., mercury). If these materials also have high dielectric constants, e.g. high-k materials, the materials may have the additional beneficial effects of increasing capacitance and decreasing leakage current. Alternatively, separate layers or materials may be used for these purposes—i.e., one material to increase breakdown voltage along with a separate high-k material. Charge storage devices using high-breakdown-voltage materials in conjunction with porous structures and organic electrolytes have much greater energy density than do charge storage devices without such components.

Figure 1E:
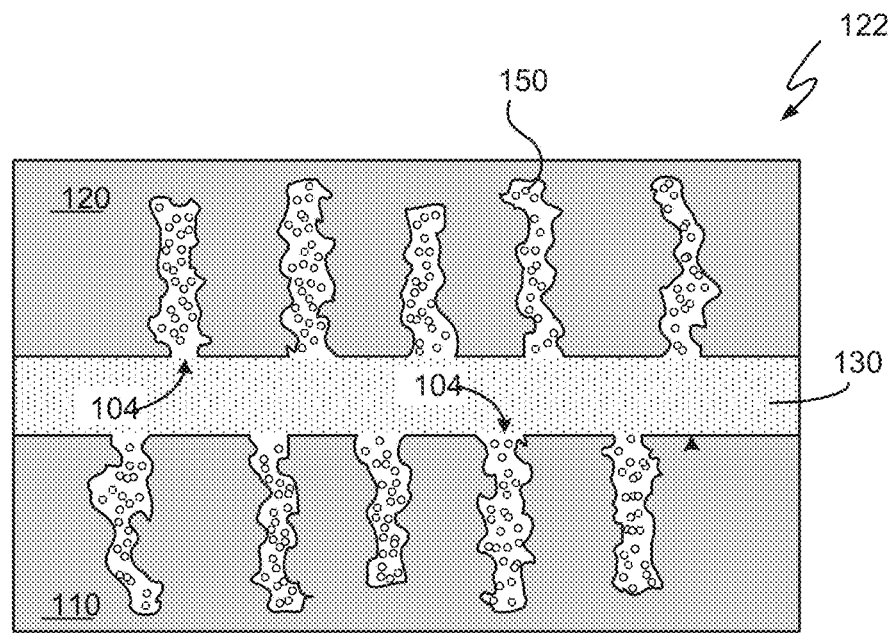
Figure 1F:
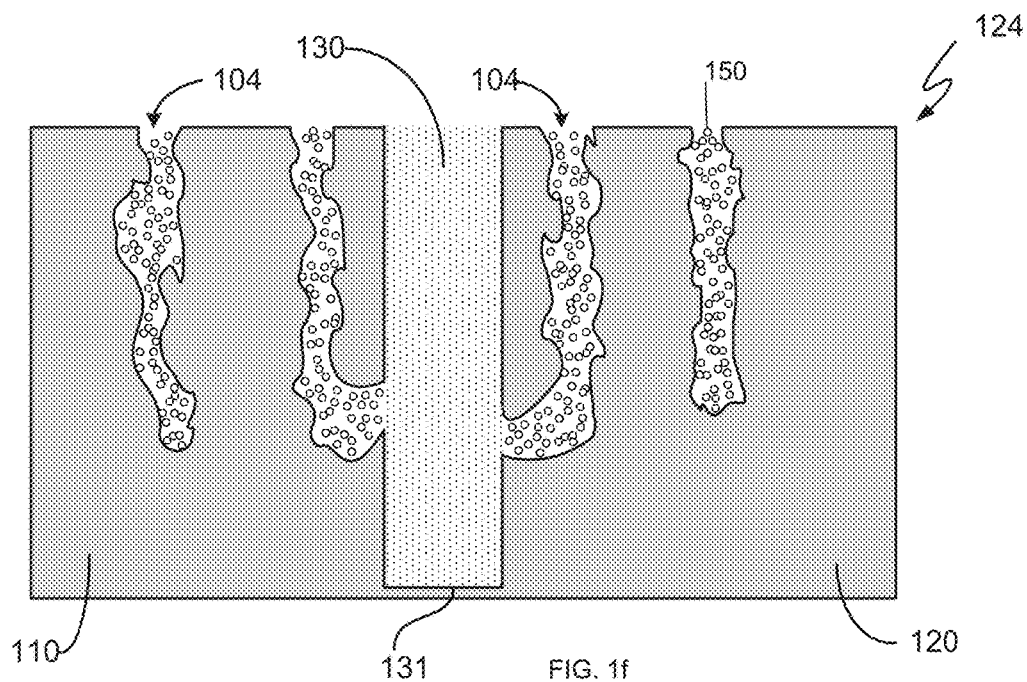

FIGS. 1e-1f depict embodiments of charge storage, electrochemical capacitor devices. In one embodiment depicted in FIG. 1e, a charge storage device 122 comprises an electrical insulator and ion conductor 130 separating a first low purity porous silicon structure 110 from a second low purity porous silicon structure 120, wherein the electrical insulator 130 comprises a dielectric material. At least one of the first and second low purity porous silicon structures comprises pores 104 (similar to the pores of FIG. 1d, for example). In an embodiment, the first and second low purity porous silicon structures 110, 120 may be bonded together face-to-lace with the intervening separator 130. The pores 104 of at least one of the first and second low purity porous silicon structures 110, 120 may further comprise an ionic material 150, such as an ionic electrolyte 150. One of the low purity porous silicon structures 110, 120 may be the positive side (electrode) and the other low purity porous silicon structures may be the negative side (electrode).

As another example, in the embodiment of FIG. 1f, charge storage electrochemical capacitor device 124 comprises a single planar porous structure in which a first section (low purity porous silicon structures 110) is separated from a second section (low purity porous silicon structures 120) by a trench 131 containing separator 130. One of the low purity porous silicon structures 110, 120 may be the positive side (electrode) and the other low purity porous silicon structures may be the negative side (electrode). Separator 130 permits the transfer of ions from the electrolyte 150, but prevents an electrical contact between the electrodes.

Figure 1G:
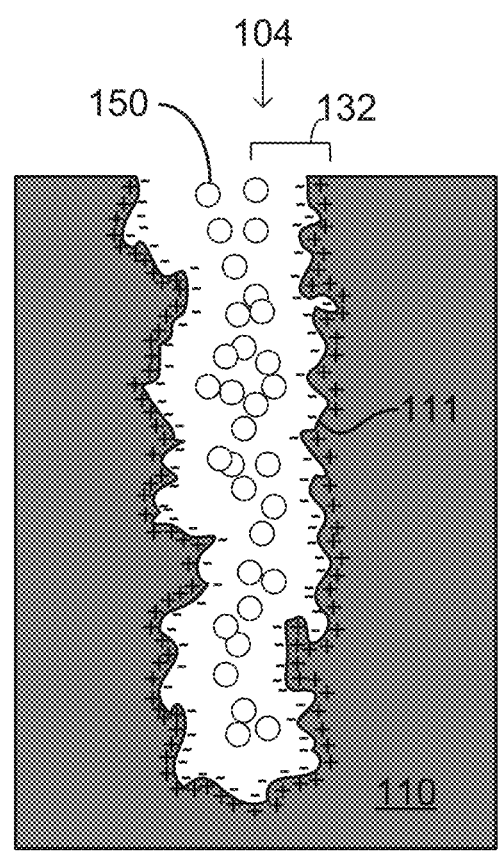

In an embodiment where electrolyte 150 is used, two electric double layers (EDL) can form, one in the pores of low purity porous silicon structures 110 and another in the pores of low purity porous silicon structures 120. This electric double layer, depicted schematically in FIG. 1g, can complement or replace the dielectric material 130 described above. As illustrated in FIG. 1g, an electrical double layer (EDL) 132 has been formed within one of pores/channels 104. EDL 132 is made up of two layers of ions, one of which is the electrical charge of the sidewalls of channel/pore 104 (depicted as being positive in FIG. 1a but which could also be negative) and the other of which is formed by free ions in the electrolyte 150. EDL 132 electrically insulates the surface, thus providing the charge separation necessary for the capacitor to function. The large capacitance and hence energy storage potential of electric double layer capacitors arises due to the small (approximately 1 nm) separation between electrolyte ions and the electrode.

It should be noted that when a charge storage device, such as charge storage devices 122, 124, are discharged, the EDL dissipates. References herein to "a first low purity porous silicon structures and a second low purity porous silicon structure separated from each other by an electrical insulator and ionic conductor" specifically include situations where, as described above, the electrical insulator is only present when the charge storage device is electrically charged.

In some embodiments electrolyte 150 is an organic electrolyte. As one example, the electrolyte can be a liquid or solid solution of organic materials such as tetraethylammonium tetrafluoroborate in acetonitrile. Other examples include solutions based on boric acid, sodium borate, or weak organic acids. Alternatively, (non-organic) water based solutions could be used as the electrolyte.

In another embodiment, instead of using low-purity silicon substrates, such as low purity silicon wafers, a method may be used whereby a low purity silicon particulate/powder material, such as metallurgical grade silicon powder or granules, may be treated in a solution to make it porous (such as by using an electrochemical etching or anodization process, for example). Depending on the powder particle size, pores can be etched through at least a portion of the particles (if not the entire micron-scale particles), yielding a network of low purity porous silicon particles with a high surface area. In another embodiment, the low purity silicon powder or granules can be formed after the electrochemical etching process that is used to form the porous structure. That is, after the low purity porous silicon structure is formed, the low purity porous silicon structure may then be broken up into particles after etching the pores. In addition, the low purity porous silicon structure can be coated with a conductor or dielectric material prior to forming the low purity porous silicon powder/particles using techniques such as ALD.

The low-purity porous silicon particle size may be typically around several microns, but can be broken into 100 nm size particles by using such techniques as ultrasound or a ball milling process, for example. The low purity porous silicon powder can then be deposited onto porous structures with good conductivity, such as onto porous aluminum scaffolding or foam. Conductive and mechanically robust binders, such as carbon nanotubes or conductive polymers, may be used to interconnect particles which comprise a controllable size, porosity, etc. The low purity porous silicon powder can be spray cast/sintered to any type of surface, substrate, or film. In an embodiment, such a substrate containing the low purity porous silicon powder may be prepared by using a roll-to-roll approach by means of deposition from solution. Use of such powder forms of low-purity porous silicon material significantly reduces the materials cost in fabricating electrochemical capacitor structures, such as ultra capacitor structures.

To prepare the low purity porous silicon particles/powder to be effective for energy storage applications, the surface can be modified by either ALD in wafer form or in powder form, further $HF/HNO_3/H_2O$ treatment to yield controllable 3-5 nm surface features, thermal anneals in a gaseous atmosphere, or wet chemical treatment in solution. Such treatments yield a conductive, passivated, stable low purity silicon particle surface on which a double layer can form. In order to promote mechanical coupling of the low purity porous silicon particles, the particles can be mixed along with conductive and/or structurally robust binder materials in aqueous or non-aqueous solutions. In an embodiment, the low purity porous silicon particles may then be cast from solution onto electrode structures, such as lightweight conductive scaffolds, with which to make electrodes for electrochemical capacitor devices. In an embodiment, a plurality of discrete electrodes, such as light weight scaffolds, may be placed in contact with an electrolyte, wherein the low purity porous silicon particles are disposed on the electrodes to form an electrochemical capacitor device.

These scaffolds can be based on rolls of foils, which can be porous or texturized in nature, that are compatible with a roll-to-roll, scalable process for solution casting of the low purity porous silicon particles. In an embodiment, in order to make a final electrochemical capacitor device, these thin foil-based collectors coated with low purity porous silicon particles and binder material can be sandwiched together with an electrolyte. In an embodiment, a Doctor-Blade method/process can be used to deposit smooth films consisting of low purity porous silicon particles.

Figure 2A:
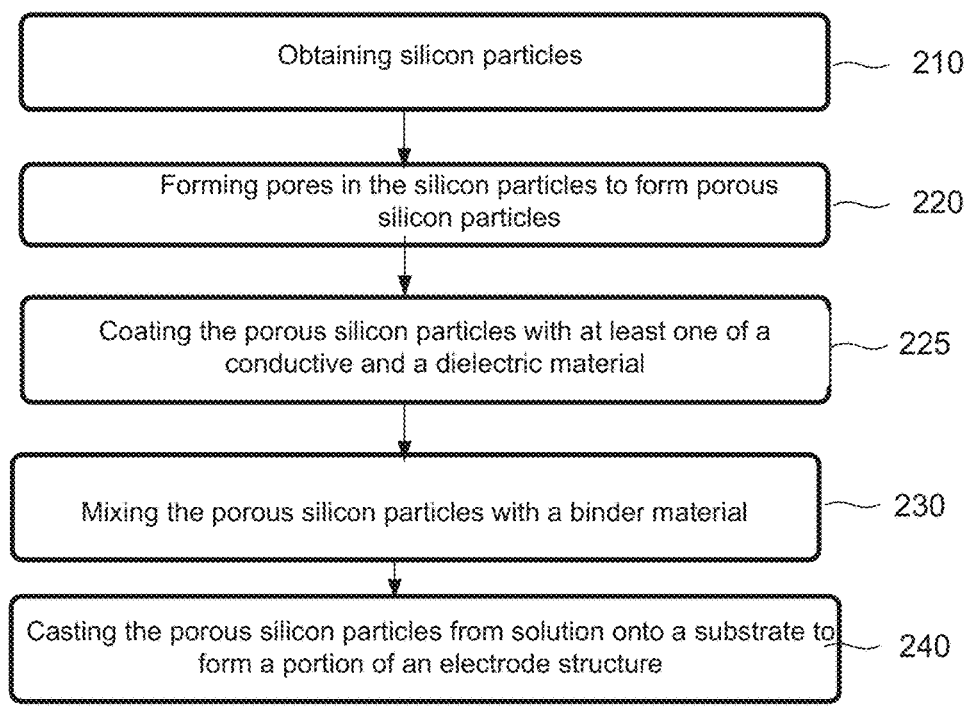
FIGS. 2a-2b represents flowcharts of methods according to embodiments.

FIG. 2a depicts a method according to an embodiment. In an embodiment, low purity silicon particles may be obtained (step 210), wherein pores may be formed therein to form low purity porous silicon particles (step 220). At step 225, the low purity porous silicon particles may be coated with at least one of a conductive and a dielectric material. The coating may be achieved using a coating process, such as but not limited to an ALD process, for example. At step 230, the low purity porous silicon particles may be mixed with a binder material. At step 240, the low purity porous silicon particles may be cast from solution onto a substrate, (such as a scaffold, for example) to form a portion of an electrochemical capacitor electrode structure.

Figure 2B:
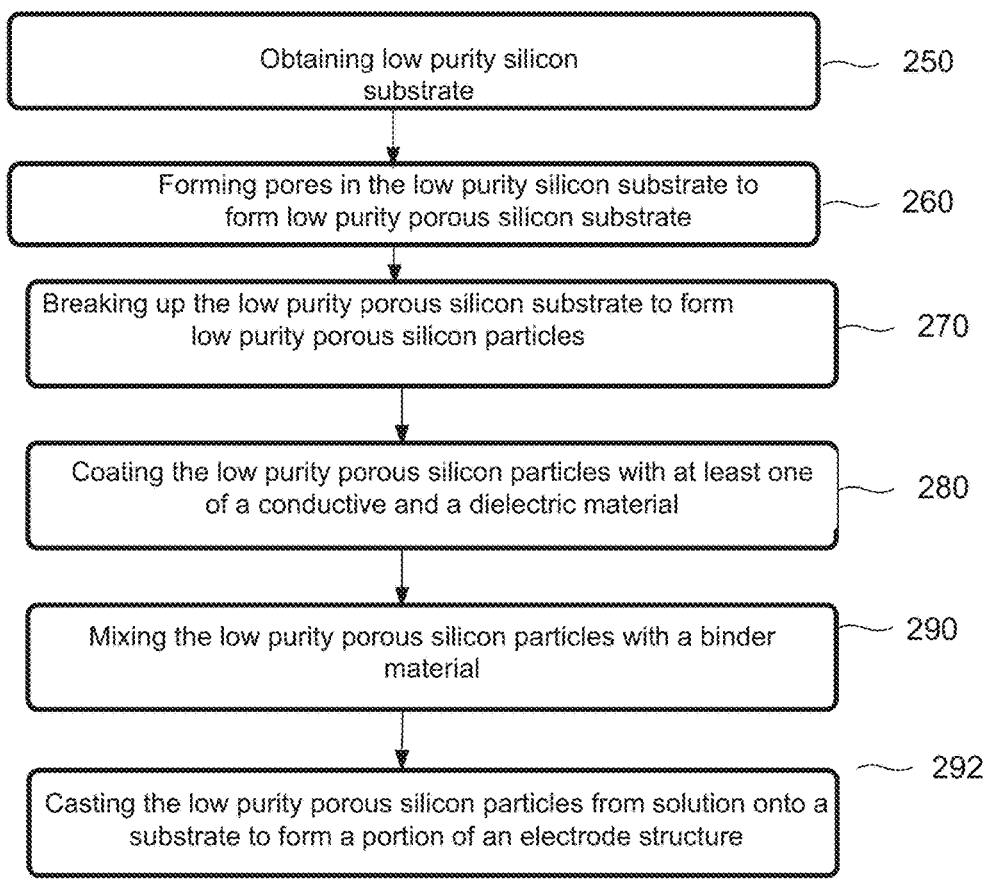

FIG. 2b depicts another method according to an embodiment. In an embodiment, a low purity silicon substrate may be obtained (step 250), wherein pores may be formed therein to form a low purity porous silicon substrate (step 260). At step 270, the low purity porous silicon may be broken up to form low purity porous silicon particles. At step 280, the low purity porous silicon particles may be coated with at least one of a conductive and a dielectric material. The coating may be achieved using a coating process, such as but not limited to an ALD process, for example. In another embodiment, the low purity porous silicon substrate may be coated prior to forming the low purity porous silicon particles. At step 290, the low purity porous silicon particles may be mixed with a binder material. At step 292, the low purity porous silicon particles may be cast from solution onto a substrate, (such as a scaffold, for example) to form a portion of an electrochemical capacitor electrode structure.

The electrochemical capacitor structures of the embodiments herein may be utilized to form low-frequency decoupling capacitors that can be used for power delivery and for the facilitation of future power demands. Such electrochemical capacitor structures of the embodiments can enable the operation of the turbo mode in multi-core microprocessors and in smaller form-factor devices, which typically require higher power capacity, smaller form factors, and higher capacitance density.

Electrochemical capacitor devices according to the embodiments herein use low-cost porous silicon that is compatible with silicon processing technology. These low cost, low purity porous silicon electrochemical capacitor devices are capable of surpassing batteries for energy per kilogram and per liter. Thus, the embodiments enable electrochemical capacitor structures that possess higher energy density than batteries. The low cost porous silicon structures/particles of the embodiments can also be used to form pseudo capacitors or hybrid ultra capacitor-battery electrodes, as well as electrodes in traditional battery devices. An advantage of the electrochemical capacitor structures herein is that they can be charged and discharged quickly because they do not rely on chemical reactions to store energy. They also do not degrade significantly over their lifetime, even when charged and discharged rapidly, and are also less sensitive to temperature than prior art batteries.

Devices fabricated with the low cost, low purity porous silicon structures included herein possess a density of 2.3290 g·cm$^{-3}$, which is similar to that of carbon graphite (2.267 g·cm$^{-3}$). Thus, the electrochemical capacitor devices of the embodiments have similar porosity and weight to those that may be prepared using carbon. An application of the electrochemical capacitor devices fabricated according to the embodiments herein is that they can be integrated into silicon devices or onto packages to provide energy storage with rapid response.

Another application of the embodiments herein is that the electrochemical capacitor devices can be used in a system together with batteries to protect the batteries from high power bursts, thereby extending the battery lifetime. Also, the electrodes in batteries can be made thinner by using the electrochemical capacitor structures herein, since they can provide for high power demands, thereby reducing their weight. Additionally, any devices that have momentary high energy, high power demands can benefit from incorporating the low purity, porous silicon structures/particles described in the embodiments herein. Also, the quick charging and discharging times of the devices described in the embodiments herein improve a users' experience, thus making them desirable for mobile devices such as smart phones and other portable devices. On a larger scale, since energy storage is important for alternative energy sources that are intermittent, such as solar and wind applications, the low purity, porous silicon structures/particles described herein may be utilized in such applications as solar and wind devices.

Figure 4:
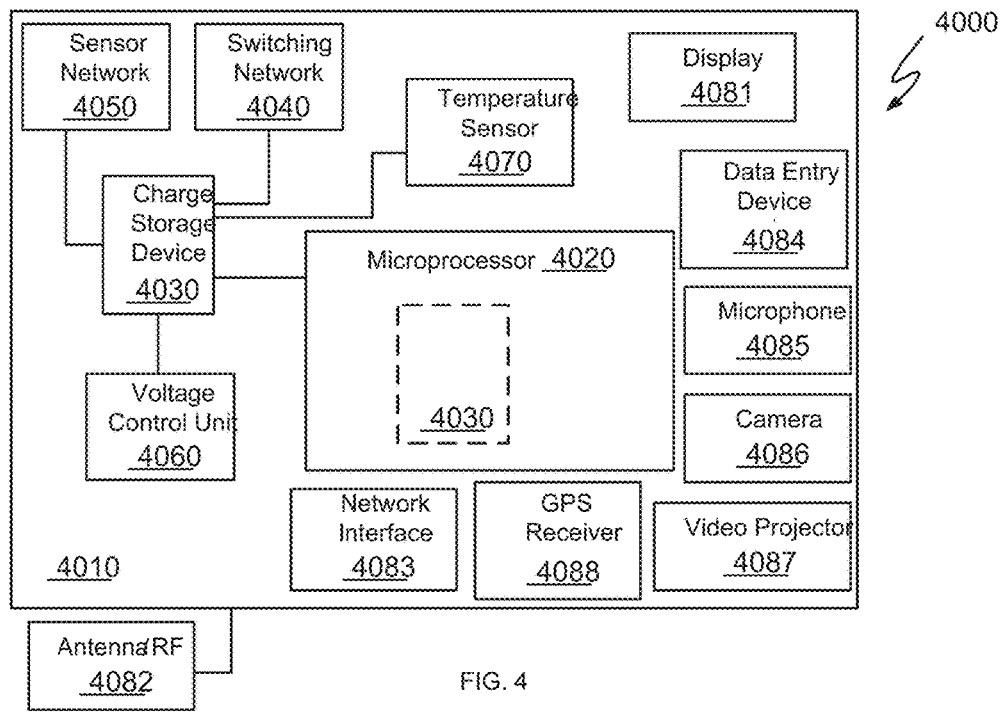
FIGS. 4-5 represent systems according to embodiments.

FIG. 4 is a block diagram representing a mobile electronic device 4000 according to an embodiment of the invention. As illustrated in FIG. 4, mobile electronic device 4000 comprises a substrate 4010 on which a microprocessor 4020 and a charge storage device/electrochemical capacitor device 4030 associated with microprocessor 4020 are disposed. Charge storage device 4030 can either be located on substrate 4010 away from microprocessor 4020, as illustrated in solid lines, or it can be located on microprocessor 4020 itself, as illustrated in dashed lines. In one embodiment charge storage device 4030 comprises first and second low purity porous silicon structures separated from each other by an electrical insulator, where at least one of the first and second low purity porous silicon structures comprises a low purity porous silicon structure containing multiple channels/pores, such as are described in the embodiments herein.

As an example, this embodiment can be similar to (and include structures depicted in) one or more of the embodiments shown in FIGS. 1e-1f and described in the accompanying text. In at least some embodiments, charge storage device 4030 is one of a plurality of charge storage devices (all of which are represented in FIG. 4 by block 4030) contained within mobile electronic device 4000. In one or more of those embodiments mobile electronic device 4000 further comprises a switching network 4040 associated with the charge storage devices. When a capacitor is being discharged it typically doesn't maintain a constant voltage but instead decays in an exponential manner (unlike a battery where the voltage stays relatively constant during discharge). Switching network 4040 comprises circuitry or some other mechanism that switches in and out various capacitors such that a relatively constant voltage is maintained. For example, the charge storage devices could initially be connected to each other in parallel and then, after a certain amount of voltage decay, a subset of the charge storage devices could be changed by the switching network so as to be connected in series such that their individual voltage contributions can boost the declining overall voltage. In one embodiment switching network 4040 could be implemented using existing silicon device technology as used in the art (transistors, silicon controlled rectifiers (SCRs), etc.), while in other embodiments it could be implemented using micro-electromechanical systems (MEMS) relays or switches (which, it may be noted, tend to have very low resistance).

In some embodiments, mobile electronic device 4000 further comprises a sensor network 4050 associated with charge storage devices 4030. In at least some embodiments, each one of the plurality of charge storage devices will have its own sensor that indicates certain behavioral parameters of the charge storage device. For example, the sensors may indicate existing voltage levels, as well as the ongoing discharge response, both of which are parameters that may be used by the switching network—especially in cases where the dielectric material (or other electrical insulator) being used is not linear, but rather has a dielectric constant that varies with the voltage. In those cases, it may be advantageous to include along with the sensor network a finite state machine such as a voltage control unit 4060 that knows what the behavior of the dielectric is and responds accordingly. A voltage control unit that knows how the dielectric behaves can compensate for any non-linearity. A temperature sensor 4070 associated with charge storage devices 4030 may also be included in order to sense temperature (or other safety-related parameters). In certain embodiments, mobile electronic device 4000 further comprises one or more of: a display 4081, antenna/RF elements 4082, a network interface 4083, a data entry device 4084 (e.g., a keypad or a touch screen), a microphone 4085, a camera 4086, a video projector 4087, a global positioning system (GPS) receiver 4088, and the like.

Figure 5:
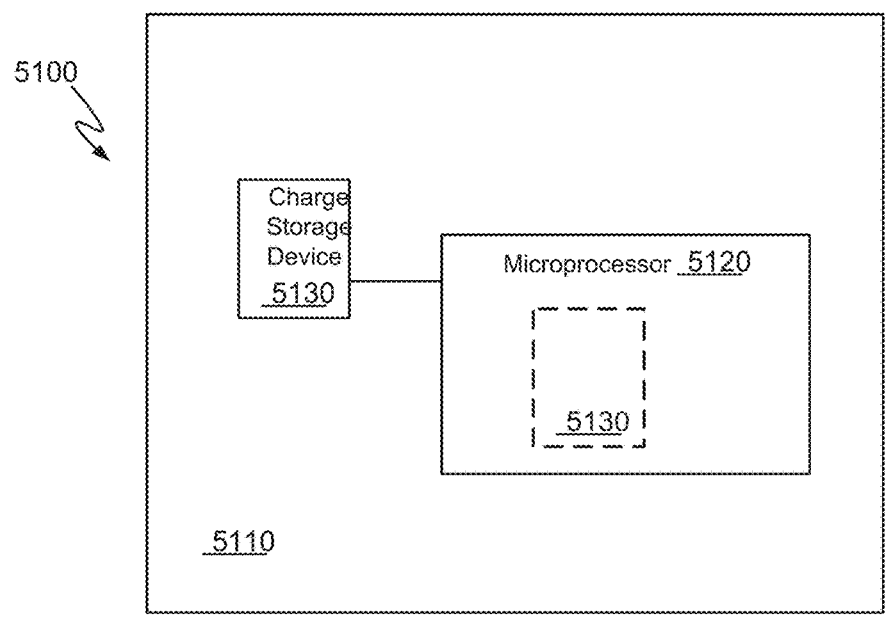

FIG. 5 is a block diagram representing a microelectronic device 5100 according to an embodiment of the invention. As illustrated in FIG. 5, microelectronic device 5100 comprises a substrate 5110, a microprocessor 5120 over substrate 5110, and a charge storage device/electrochemical capacitor device 5130 according to embodiments herein, associated with microprocessor 5120. Charge storage device 5130 can either be located on substrate 5110 away from microprocessor 5120 (e.g., a die-side capacitor), as illustrated in solid lines, or it can be located on microprocessor 5120 itself (e.g., in a build-up layer above the microprocessor), as illustrated in dashed lines. In one embodiment charge storage device 5130 comprises first and second low purity porous silicon structures separated from each other by an electrical insulator, where at least one of the first and second low purity porous silicon structures comprises multiple channels/pores. As an example, the low purity porous silicon structures of this embodiment can be similar to one or more of the embodiments shown in FIGS. 1e-1f and described in the accompanying text.

The charge storage devices disclosed herein may in some embodiments be used as a decoupling capacitor within microelectronic device 5100—one that is smaller and that, for the reasons described elsewhere herein, offers much higher capacitance and much lower impedance than existing decoupling capacitors. As already mentioned, charge storage device 5130 can be part of a support integrated circuit (IC) or chip or it can be located on the microprocessor die itself. As an example, one might, according to embodiments of the invention, be able to form regions of low purity porous silicon (or the like, as described above) on a microprocessor die and then create a high-surface-area embedded decoupling capacitor right on the substrate of the microprocessor die. Because of the porosity of the low purity silicon, the embedded capacitor would have very high surface area. Other possible uses for the disclosed charge storage devices include use as a memory storage element (where problems with the z-direction size of embedded DRAM approaches may be solved by greatly increasing the farads per unit area) or as a component of voltage converters in voltage boost circuitry, perhaps for use with circuit blocks, individual microprocessor cores, or the like.

As an example, higher capacitance values could in this context be advantageous because parts of the circuit could then run nominally at a certain (relatively low) voltage but then in places where higher voltage is needed in order to increase speed (e.g., cache memory, input/output (I/O) applications) the voltage could be boosted to a higher value. An operational scheme of this sort would likely be preferred over one in which the higher voltage is used everywhere; i.e., in cases where only a small amount of circuitry requires a higher voltage it likely would be preferable to boost the voltage from a lower baseline voltage for that small portion of the circuit rather than drop the voltage from a higher baseline value for the majority of the circuitry. Future microprocessor generations may also make use of voltage converters of the type described here. Having more capacitance available to be deployed around a package or around a microprocessor die may help solve the existing issue of intolerably high inductance between transistors that transfer voltage around a circuit.

Although the foregoing description has specified certain steps and materials that may be used in the embodiments, those skilled in the art will appreciate that many modifications and substitutions may be made. Accordingly, it is intended that all such modifications, alterations, substitutions and additions be considered to fall within the spirit and scope of the embodiments as defined by the appended claims. The Figures provided herein illustrate only portions of exemplary microelectronic structures that pertain to the practice of the embodiments. Thus the embodiments are not limited to the structures described herein.

What is claimed is:

1. A method of making a charge storage structure, the method comprising:
   forming pores in a low-purity silicon substrate to form a low purity porous silicon structure wherein the low purity silicon substrate has a purity of 99.999 percent or less purity of silicon; and
   forming an electrochemical capacitor comprising one of (1) a first low purity porous silicon structure and a second low purity porous silicon structure separated by an electrical insulator comprising a dielectric material, or (2) a first low purity porous silicon section and a second low purity porous silicon section separated by an electrical insulator comprising a dielectric material.

2. The method of claim 1 further comprising wherein the pores comprise a depth of up to about 300 microns.

3. The method of claim 1 further comprising forming an electrically conductive material within the pores, wherein the electrically conductive material lines the pores.

4. The method of claim 3 further comprising wherein the electrically conductive material is formed by an atomic layer deposition process.

5. The method of claim 4 wherein the electrically conductive material is formed using one of a roll to roll process and a batch process.

6. The method of claim 4 wherein the atomic layer deposition process flows through the low purity porous silicon structure.

7. The method of claim 3 further comprising forming a dielectric material on the electrically conductive material.

8. The method of claim 3 further comprising wherein the electrically conductive material comprises at least one of tungsten, aluminum, copper, nickel, iron, cobalt, carbon, palladium, ruthenium, tin, aluminum titanium nitride, titanium nitride, tungsten nitride, tantalum nitride, tungsten titanium nitride, titanium silicon nitride, tungsten silicon nitride, titanium boron nitride, and molybdenum nitride.

9. The method of claim 1 further comprising forming a dielectric material within the pores.

10. The method of claim 9 further comprising forming an electrically conductive material on the dielectric material.

11. The method of claim 9 further comprising wherein the dielectric material
    comprises a high k dielectric material.

12. The method of claim 1 further comprising using an electrolyte to form an electrical double layer within a pore, and wherein the pore comprises a channel of the electrical double layer.

13. The method of claim 1 further comprising wherein the low purity substrate comprises one of metallurgical grade silicon and polysilicon, and wherein the electrochemical capacitor structure comprises a microelectronic electrochemical capacitor.

14. The method of claim 1 further comprising wherein the low purity porous silicon structure includes one of a p-type dopant and n-type dopant.

15. The method of claim 1 wherein the pore comprises a tapered structure.

16. The method of claim 1 wherein the pores are formed by one of electrochemical etching, anodization and stain etching.

17. The method of claim 16 wherein the electrochemical etching comprises a batch electrochemical etching process.

18. The method of claim 1 wherein the low purity substrate comprises one of metallurgical grade silicon and polysilicon, and wherein the electrochemical capacitor comprises a microelectronic electrochemical capacitor.

19. A method of making a charge storage structure, the method comprising:
    forming pores in a low-purity silicon substrate to form a low purity porous silicon structure, wherein the charge storage structure comprises a portion of an electrochemical capacitor structure, wherein the low purity silicon substrate has a purity of 99.999 percent or less purity of silicon and the electrochemical capacitor structure comprises a first low purity porous silicon structure and a second low purity porous silicon structure separated by a an electrical insulator comprising a dielectric material.

20. The method of claim 19 further comprising forming the electrochemical capacitor structure by forming the first low purity porous silicon structure and second low purity porous silicon structure separated by the electrical insulator.

21. The method of claim 20 wherein the electrical insulator is capable of ionic conduction.

22. The method of claim 20 further comprising forming at least one of a refractory metal oxide, a refractory metal nitride, and a refractory metal carbide on one of the first low purity porous silicon structure and the second low purity porous silicon structure.

23. The method of claim 22 wherein the electrochemical capacitor comprises a pseudo capacitor.

24. A method of making a charge storage structure, the method comprising:
    forming pores in a low-purity silicon substrate to form a low purity porous silicon structure wherein the low purity silicon substrate has a purity of 99.999 percent or less purity; and
    forming an electrochemical capacitor comprising a low purity porous silicon structure and an electrical insulator, wherein the electrical insulator is capable of ionic conduction and comprises a dielectric material.

25. The method of claim 24 wherein the low purity substrate comprises one of metallurgical grade silicon and polysilicon, and wherein the electrochemical capacitor comprises a microelectronic electrochemical capacitor.

26. A method of making a charge storage structure, the method comprising:
    forming pores in a low-purity silicon substrate to form a low purity porous silicon structure wherein the low purity silicon substrate has a purity of 99.999 percent or less purity;
    forming an electrochemical capacitor comprising a low purity porous silicon structure and an electrical insulator comprising a dielectric material, and
    forming at least one of a refractory metal oxide, a refractory metal nitride, and a refractory metal carbide on one of the low purity porous silicon structure.

27. The method of claim 26 wherein the low purity substrate comprises one of metallurgical grade silicon and polysilicon, and wherein the electrochemical capacitor comprises a microelectronic electrochemical capacitor.

28. A method of making a charge storage structure, the method comprising:
    forming pores in a low-purity silicon substrate to form a low purity porous silicon structure wherein the low purity silicon substrate has a purity of 99.999 percent or less purity;
    forming an electrochemical capacitor comprising a low purity porous silicon structure and an electrical insulator comprising a dielectric material, wherein the electrochemical capacitor comprises a pseudo capacitor.

29. The method of claim 28 wherein the low purity substrate comprises one of metallurgical grade silicon and polysilicon, and wherein the electrochemical capacitor comprises a microelectronic electrochemical capacitor.

* * * * *